Patented Jan. 26, 1943

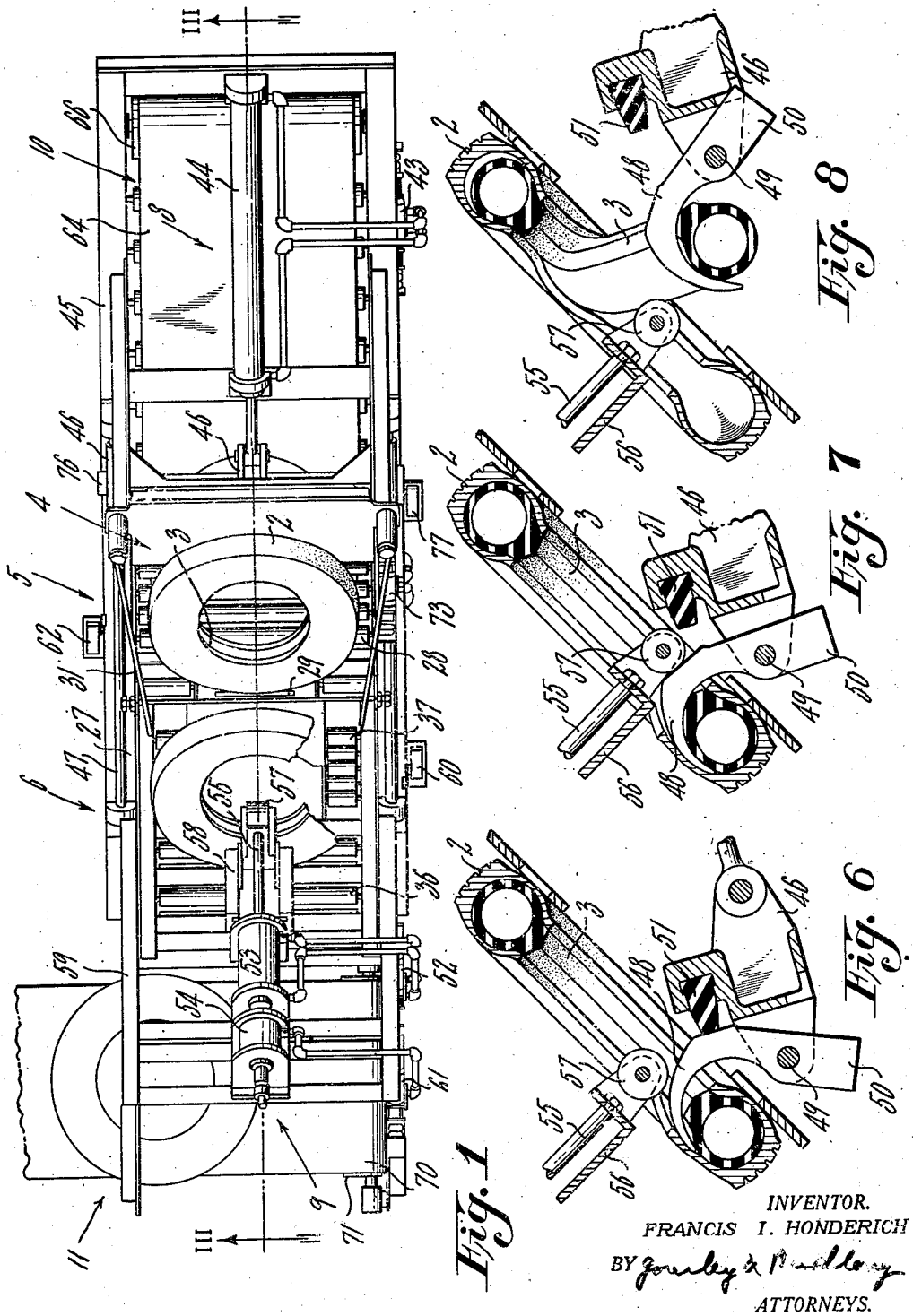

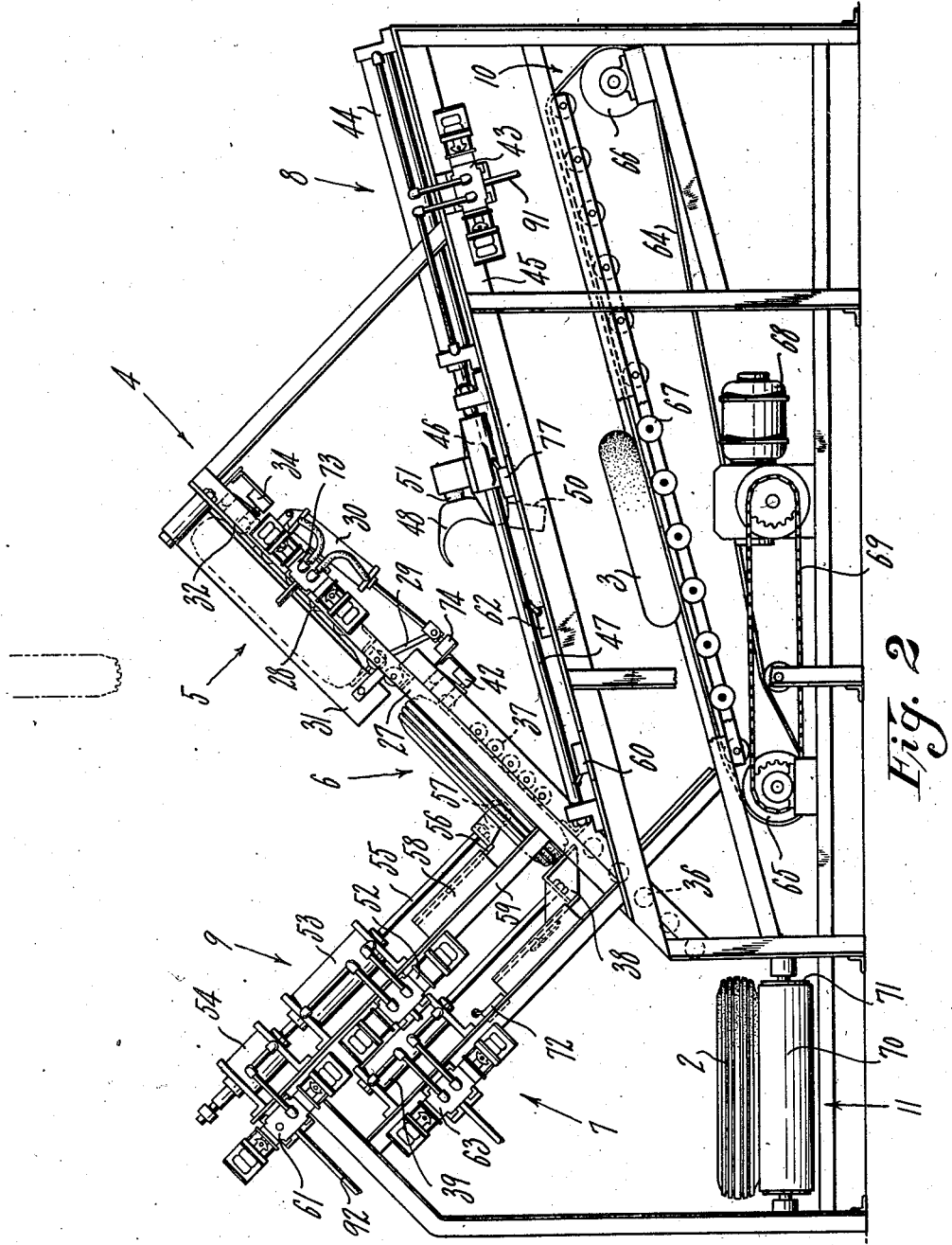

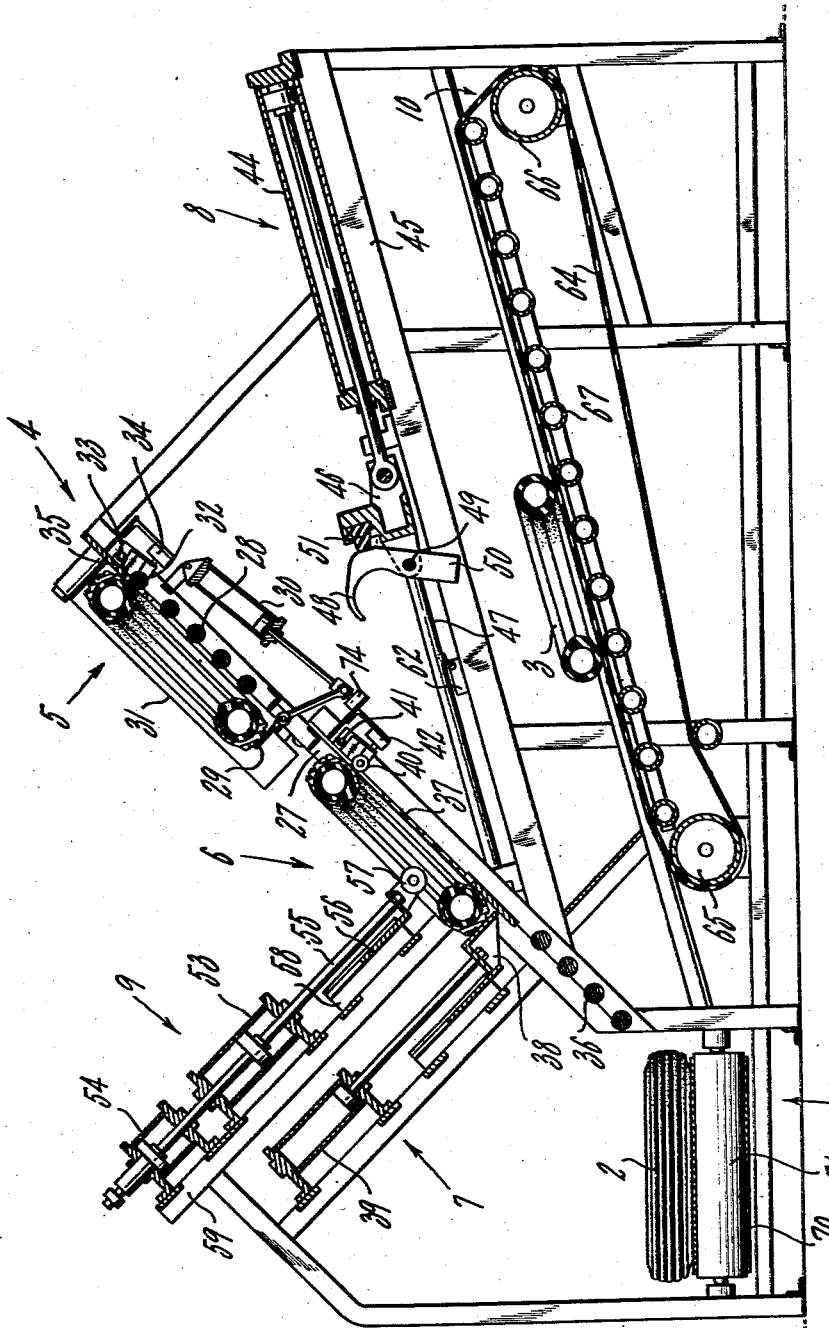

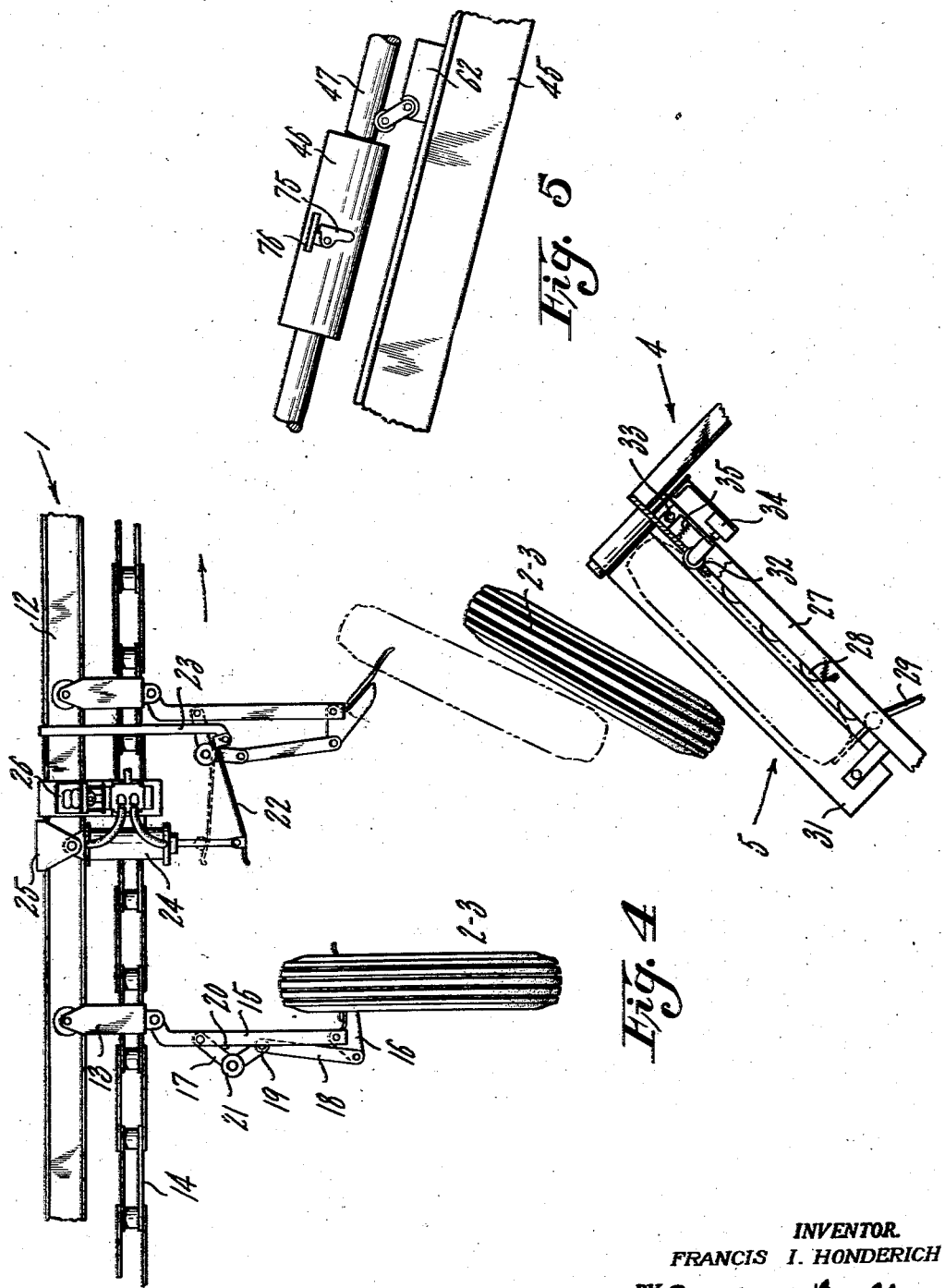

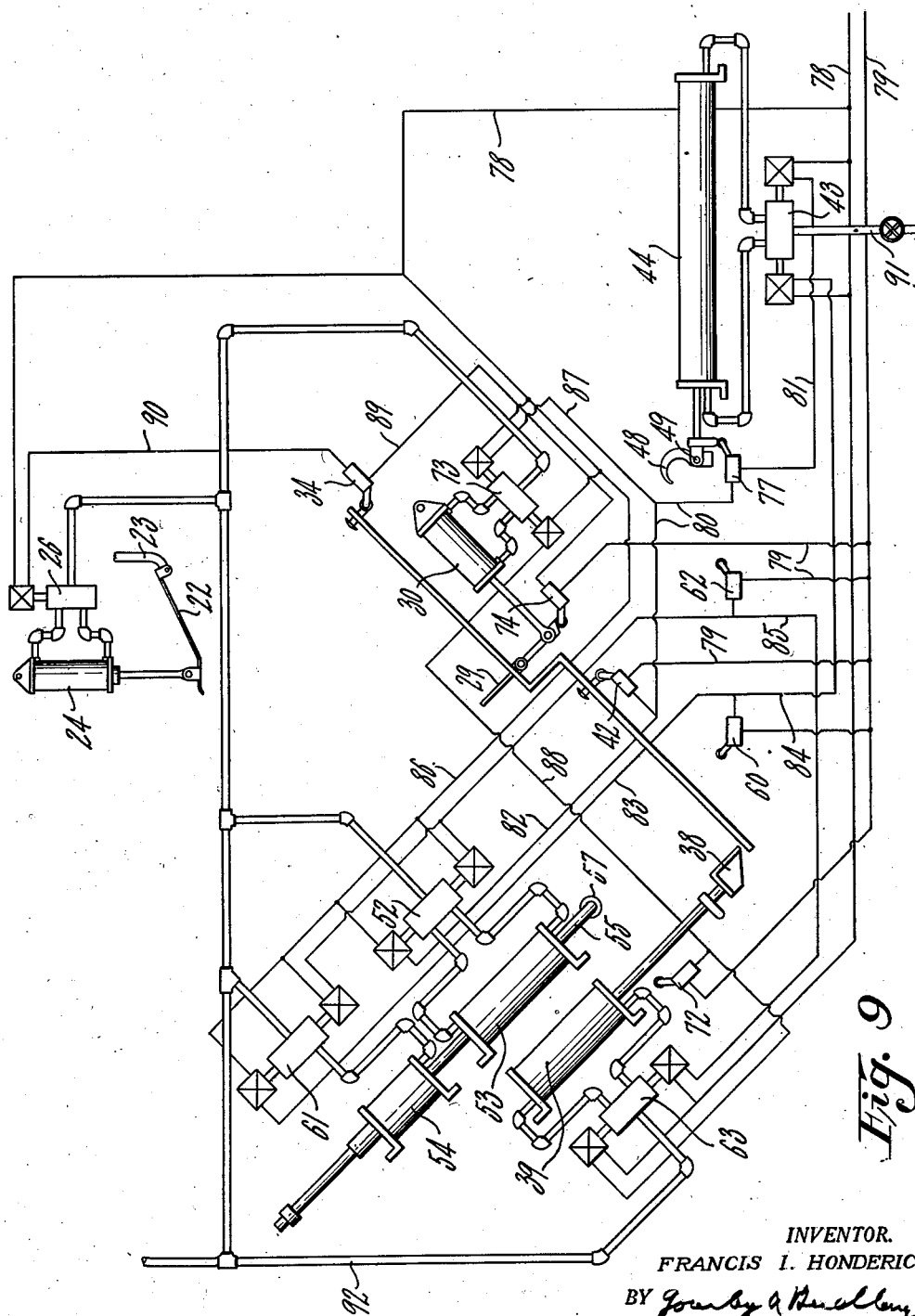

2,309,590

UNITED STATES PATENT OFFICE 2,309,590

APPARATUS FOR MANUFACTURING TIRES

Francis I. Honderich, Natchez, Miss., assignor by mesne assignments, to United States Rubber Company, New York, N. Y., a corporation of New Jersey Application October 27, 1938, Serial No. 237,206

7 Claims. (Cl. 18—2)

This invention relates to apparatus for an operation in manufacturing pneumatic tires, and in particular it relates to apparatus for automatically removing curing bags from pneumatic tires.

In general, the invention comprises a conveyor, means for removing an assembled tire and curing bag from the conveyor, means for removing the curing bag from the tire, and means for transporting the tire and the curing bag from the curing bag removing means.

In the manufacture and vulcanization of pneumatic tires it is necessary to insert curing bags in the tires for the purpose of providing a container for inflating fluids. Heretofore, a considerable amount of manual labor has been required in handling the tires in order to effect removal of the curing bags. As the curing bags are removed from the tires directly after vulcanization, the tires and bags are hot, and handling of these articles presents a difficult problem for the operator. Furthermore, escaping steam from the curing bag adds to the difficulty of handling.

Among the objects of the invention are, to provide an efficient automatic means for removing curing bags from tires, to obviate strenuous and fatiguing labor, and to provide uniformity in the treatment and cycle of operation.

These and other objects and advantages will appear more fully in the following detailed description, when considered in connection with the accompanying drawings, in which:

Fig. 1 is a plan view of an appratus embodying features of the invention;

Fig. 2 is an elevational view thereof;

Fig. 3 is an elevational view of the apparatus, in section, taken along section line III—III of Fig. 1;

Fig. 4 is an elevational view of a tire carrying conveyor, showing its position relative to the bag removing apparatus;

Fig. 5 is a detail view, in elevation, of a timing switch mechanism operated by a bag pulling arm;

Figs. 6, 7 and 8 are fragmentary detail views, in section, illustrating different stages in the removal of a curing bag from a tire; and Fig. 9 is a wiring and piping diagram for the apparatus.

Referring to the drawings, a conveyor 1 (Fig. 4) supplies the curing bag removing device with tires 2 assembled with curing bags 3, in accordance with efficient methods of tire manufacture providing for continuous conveyance of the tires from operation to operation. Release mechanism hereafter described causes a tire and curing bag assembly to drop from the conveyor to an inclined gravity conveyor 4 upon which, as shown in Fig. 2, the assembly assumes first, or feeding, and second, or work, positions designated by reference characters 5 and 6, respectively. A stop mechanism 7 detains successive assemblies on the gravity conveyor while a bag removing mechanism 8 withdraws the curing bag 3 from the foremost tire 2. An auxiliary device 9 assists the bag removing mechanism 8 in obtaining a proper grip on the curing bag 3. After a curing bag is removed from a tire it is transported along a conveyor 10, and the tire is released from the gravity conveyor and is moved away by a conveyor 11.

Essentially, the conveyor 1 (Fig. 4) is of conventional construction of the overhead type. It comprises a supporting beam 12, a plurality of carriages 13, and a chain 14 connected to the carriages. Arms 15 extend from each of the carriages and support a pivoted hook 16. Normally, the hook 16 is retained by links 17 and 18, the former being of L-shape, in position for supporting a tire and curing bag assembly. The link 17 is pivotally attached to the arm 15, and the link 18 is pivotally attached to the hook 16. The links are pivoted together at 19. A stop 20 limits the movement of the link 17 and maintains the members in an off-center locked position to form a substantial support for carrying the tire assembly.

A trip cam 21 is attached to the link 17 and cooperates with a trip arm 22 pivotally attached to a bracket 23 extending from the beam 12. As the conveyor moves in the direction indicated by the arrow, the trip cam 21 engages with the trip arm 22, causing an elevated movement of the links 17 and 18, which moves them out of off-center position, thus permitting the unsupported hook 16 to swing about its pivot and to release the tire assembly positioned on the hook. The release of the tire assembly is timed in such manner that it will drop into position 5 on the inclined gravity conveyor 4, which position is normally unoccupied for reception of the new tire assembly.

To prevent the possibility of one tire dropping upon another, the trip arm 22 is movable out of engagement with the trip cam 21 by means of a fluid operating cylinder 24 pivotally attached to a bracket 25 secured to the beam 12. The piston rod extending from the cylinder 24 pivotally engages with the trip arm 22. A conventional, electrically operated fluid valve control 26 functions to operate the fluid cylinder 24 at proper intervals. Means for operating the electric valve control 26 will be described hereinafter.

The inclined gravity conveyor 4 on to which the tire assembly is dropped consists essentially of a structural frame member 27 (Figs. 2 and 3). In position 5 of the conveyor 4 the frame 27 supports a plurality of freely rotating rollers 28. The tire assembly is retained in position 5 until the curing bag of the preceding tire has been removed. Means for retaining the tire assembly in position 5 is effected by a stop arm 29 pivotally attached to the frame 27 and to the piston rod of a fluid operating cylinder 30.

Guide members 31 are provided on either side of the conveyor 4 at position 5. As the tire assembly rests in this position, a roller 32 pivotally attached to the frame at 33 is engaged by the tire assembly, the result of which causes the roller 32 to swing on its pivot 33 and to engage an electric switch 34. This action, as hereinafter more particularly described, causes the electric valve control 26 (Fig. 4) to be energized, thus elevating the trip arm 22 to the position indicated by the dotted lines. When the trip arm 22 is in its elevated position, the tire assemblies, guided by the conveyor 1, are moved past the gravity conveyor 4 without being released from the hook 16. A spring 35 (Fig. 3) maintains the roller 32 in its normal position for engaging the tire 2.

The stop arm 29 (Fig. 3) is normally in a position to permit the tire assembly to move by gravity along the conveyor 4. However, when a tire assembly is in position 6 on the conveyor 4, the cylinder 30 is actuated so as to move the arm 29 into stop position to prevent a tire from moving from position 5 to position 6. At the start of the operation the stop arm 29 is clear of the path of the tire assembly in position 5, thus permitting the tire assembly to move directly into position 6.

The gravity conveyor 4 in position 6 includes a plurality of freely rotatable rollers 36 extending across the path of the conveyor, and a plurality of rollers 37 which, as shown in Fig. 1, are positioned only at the marginal portions of the conveyor. This arrangement permits a relatively large opening through the conveyor so that the curing bag 3 may be withdrawn from the tire 2 from the under side of the conveyor.

Before a tire assembly reaches the position 6, a stop bracket 38 connected to a fluid operable cylinder 39 moves into the path of the tire assembly on the gravity conveyor. As the tire assembly moves from position 5 to position 6, the tire strikes a movable roller 40 pivotally attached to the frame at 41. Movement of the roller 40 from the weight of the tire assembly results in the completion of an electric circuit within a switch box 42. This action simultaneously energizes the bag removing mechanism 8 and the auxiliary device 9 for assisting the bag removing mechanism.

Actuation of the switch 42 causes a reverse movement of the piston in cylinder 30 resulting in movement of the stop arm 29 into the path of the conveyor 4 to prevent a tire from moving from position 5 to position 6.

Among other operations, actuation of the switch box 42 energizes a conventional electric valve control 43 (Fig. 2) for operating the bag removing mechanism 8. Essentially, the mechanism 8 consists of a fluid operable cylinder 44 supported on an inclined plane by structural framework 45. A piston rod in the cylinder 44 joins with a cross head 46 slidably supported by guide rods 47. A hook member 48 pivotally attached to the cross head 46 at 49 includes a weighted portion 50 which, through the pivot 49, maintains the hook member in its normal, inoperable position. A rubber bumper 51 secured to the cross head 46 functions to cushion the backward movement of hook 48 after a curing bag is removed.

Operation of the switch box 42 causes the hook member 48 to advance toward the curing bag 3. At the same time, operation of the switch box 42 causes a conventional electrical valve control 52 (Fig. 2) to be energized, thus operating the auxiliary device 9 which assists the bag removing mechanism. This auxiliary device 9 comprises dual and separately operated cylinders 53 and 54, having a common piston rod 55 to which a bracket 56 and a roller 57 are attached. The bracket 56 slidably engages with a supporting member 58 secured to a structural frame 59 which also supports the cylinders 53 and 54.

The location of the roller 57 after it is moved into position is such that it extends part way through the aperture formed by the beads or the rim portions of the tire. In this position the roller 57 acts as a means for guiding the hook 48 into proper initial position between the interior wall of the tire casing and the exterior wall of the curing bag, as shown in Fig. 6. When this relationship between the guide roller 57 and the hook 48 is reached, a switch box 60 (Fig. 2) is actuated by engagement with the cross head 46. Actuation of the switch box 60 causes the hook member 48 to recede, while simultaneously advancing the guide roller 57. At this stage of the operation the electrical valve control 43 is energized, resulting in the receding movement of the hook member 48 for withdrawing the curing bag 3 from the tire 2. Simultaneously, a conventional electric valve control 61 is energized, causing advance movement of the piston rod 55 through actuation of the cylinder 54. As a result of the advance movement of the guide roller 57 and the simultaneous withdrawal of the hook member 48, the hook member is caused to encircle a substantial portion of the curing bag, so as to pull the curing bag from the tire casing upon the receding movement of the hook, as is consecutively shown in Figs. 7 and 8.

As the hook member is in receding operation, the cross head 46 engages a switch box 62, and the control valves 52 and 61 are actuated to operate cylinders 53 and 54 respectively, resulting in retractive movement of the guide roller 57 out of the path of the tire assembly on the conveyor 4. Actuation of the switch box 62 simultaneously energizes a conventional electric valve control 63 for operating the cylinder 39 and the stop bracket 38.

Due to the receding movement of the hook member 48, the curing bag 3 is pulled out of the tire casing 2 through the under side of the conveyor 4, and is permitted to drop on to a conveyor mechanism 10 (Fig. 2). This conveyor mechanism 10 is of conventional construction, consisting essentially of a conveyor belt 64 forming a reach between rollers 65 and 66, and having a belt support in the form of a plurality of idler rollers 67. A combination motor and reduction unit 68, through a chain 69, drives the roller 65. This conveyor mechanism operates continuously and curing bags that drop on to the conveyor are immediately moved away from the bag removing operation.

Both the guide roller 57 and the stop bracket 38 are moved out of the path of the tire 2 resting on the conveyor 4, thus permitting free movement of the tire down the conveyor and onto the tire removing conveyor 11. The tire removing conveyor 11 is of conventional type, comprising a belt 70 supported by a roller 71. An independent drive (not shown) operates the conveyor belt continuously. The conveyor 11 is located below the conveyor 4, and therefore the release of a tire from the conveyor 4 operates automatically to transfer the tire from conveyor 4 to the conveyor 11.

As the stop bracket 38 moves into its receding position it engages a switch box 72 which reverses the cylinder 39 and brings the stop bracket 38 back into position in the path of the conveyor 4. During a cycle of movement of the stop bracket 38 the tire 2 has sufficient time to move from the conveyor 4 on to the conveyor 11. Actuation of the switch box 72 through a wire 88 (Fig. 9) simultaneously energizes a conventional electric valve control 73 (Fig. 2) which operates the cylinder 30, causing the stop arm to move out of the path of the tire assembly in its position 5 on the conveyor 4.

As a tire assembly is moved partly out of the position 5, actuation of the switch box 34 is released and there is a probability that another tire assembly will drop from the conveyor 1 into position 5 before the preceding tire is entirely removed therefrom. In order to overcome this occurrence, an additional switch box 74 is provided for breaking the circuit which results in the transfer of such a tire assembly from the conveyor 1. The switch box 74 which breaks the circuit is operated by the stroke of the piston rod working in the cylinder 30 for controlling the stop arm 29. Therefore, before a tire assembly can be transferred from the conveyor 1 to the conveyor 4, it is necessary that there be no tire in position 5 on the conveyor 4, and that the stop arm be in position to retain a tire in position 5.

It will be noted that the position 5 of the tire assembly on the conveyor 4 is on a different plane than the tire assembly in position 6. By this arrangement the tire assembly as it moves from position 5 to position 6 does not contact with the switch roller 40 (Fig. 3) until the tire assembly reaches substantially its final location in position 6. In position 6 the tire assembly engages the roller 40 forming a contact in the switch box 42 and starting a cycle of operation as hereinbefore described.

Referring to the operation of the bag removing mechanism 8, it will be noted that the intermediate switch box 62 is operated only upon the receding movement of the hook member 48. This arrangement is shown in detail in Fig. 5 in which the cross head 46 is provided with a pivoted lug 75 having a portion thereof adaptable to engage with a bracket 76 extending from the cross head 46. By this construction the switch box 62 will be actuated only upon the return movement of the hook member 48. When the hook member 48 reaches its receded position, the cross head 46 strikes a switch box 77 and completes a circuit between the electric valve control 43 and the switch box 42, the actuation of which is the initial start of the operation.

Referring to Fig. 9, I show a diagrammatic view illustrating the wiring and piping arrangement for controlling the various operations of the apparatus. In this view the principal electric wires extending to a source of energy are indicated by the references 78 and 79. Assuming that tire assemblies are in position 5 and position 6, the start of the operation results from actuation of the switch box 42 by reason of the weight of the tire assembly on roller 40.

When the switch box 42 is thus actuated, the electric valve control 73 is energized by means of its connection to the switch box 42 through wires 80 and 87. Actuation of this valve control operates cylinder 30 which moves the stop arm 29 into the tire path on the conveyor 4. This prevents a tire from moving from position 5 while a tire remains in position 6.

A wire 80 connects the switch box 42 through a completed circuit in the switch box 77 and through a wire 81 to the electric valve control 43. Actuation of this control causes movement of the hook member 48 toward the tire assembly. Simultaneous with the actuation of the switch box 42 a wire 82 leading therefrom completes a circuit for energizing the electric control valve 52, resulting in movement of the guide roller 57 into its first position with respect to the hook member 48. As the hook member 48 is advanced to substantially its outermost position, switch box 60 is actuated and a wire 83 leading therefrom to the electric valve control 61 energizes same and actuates the fluid cylinder 54 for moving the guide roller 57 into its final operating position with respect to the hook member 48. A wire 84 extending from the switch box 60 to the electric valve control 43 simultaneously energizes the control valve 43, causing the hook member 48 to recede. While the hook member 48 recedes, it engages the switch box 62 and a wire 85 leading therefrom connects with and energizes the electric valve control 63 to raise the stop bracket 38 out of the path of the conveyor 4. In a simultaneous operation the electric valve controls 61 and 52, through a wire 86, are energized, causing actuation of the cylinders 54 and 53 to withdraw the guide roller 57 away from the path of the conveyor 4. The tire in position 6 now being free leaves the conveyor 4, thus breaking the circuit in the switch box 42.

While the switch box 34 primarily operates to prevent discharge of a tire assembly from the overhead conveyor 1 to the inclined conveyor 4, the secondary switch box 74 cooperates with the switch box 34 through a connection 89. By this arrangement a tire will not be transferred from the overhead conveyor 1 to the gravity conveyor 4 while a tire remains in position 5 on the conveyor or while the stop arm 29 is in a lowered position to permit the tire assembly to move from position 5 to position 6. The switch box 74 is controlled by movement of the stop arm 29 through operation of the cylinder 30. A wire 90 connects the switch box 34 with the electric valve control 26 on the overhead conveyor 1.

A pipe line 91 extending to a source of fluid under pressure connects with the electric valve control 43, and with the bag removing cylinder 44. Also, a pipe line 92 extending to a source of fluid under pressure connects with electric valve controls 26, 73, 52, 61 and 63, and to the cylinders 24, 30, 53, 54, and 39, respectively.

From the foregoing description, when considered in connection with the accompanying drawings, it is apparent that a tire assembly in the proper sequence of operation will be transferred from the overhead conveyor 1 to a feeding position 5 on the inclined gravity conveyor 4; and that from the latter position the tire assembly will automatically move to work position 6 whereat a curing bag is removed from the tire in the manner shown in detail by Figs. 6, 7, and 8. In this operation the curing bag drops on to a belt type conveyor 10 where it is directed toward an operating cycle for reassembling the curing bag with another tire. The tire 2, after the curing bag is removed therefrom, moves from its position 6 on the gravity conveyor to a belt type conveyor 11 where it is taken away from the bag removing apparatus.

While I have shown and described a preferred embodiment of my invention, it is to be understood that it may be otherwise subject to modifications as indicated by the scope of the appended claims.

Having thus described my invention, what I claim and desire to protect by Letters Patent is:

1. An apparatus for removing curing bags from pneumatic tires, comprising a support for a tire, means for retaining the tire on the support, means for transferring the tire from one position on the support to another position along the support, means for retaining the tire in the second position on the support, a hook for engaging a curing bag within the tire, means for engaging the hook for holding it in stripping engagement with the curing bag, means for moving the hook to remove the curing bag, and means for releasing the stripped tire from the support.

2. In a curing bag removing mechanism, a support, a pivoted hook, means for supporting and reciprocating the hook, and a guide movable angularly to the direction of the reciprocal movement of the hook for engaging the hook and turning it to force it between a tire and a curing bag on the support.

3. In a curing bag removing mechanism, a support, a pivoted hook, means for supporting and reciprocating the hook, and a reciprocating guide movable angularly to the direction of the reciprocal movement of the hook for engaging the hook and turning it to force it between a tire and a curing bag on the support.

4. In a curing bag removing mechanism, a support, a pivoted hook, means for supporting and reciprocating the hook, a reciprocating guide movable angularly to the direction of the reciprocal movement of the hook for engaging the hook and turning it to force it between a tire and a curing bag on the support, and means on said guide for engaging an edge of the tire.

5. In a curing bag removing mechanism, a support, a pivoted hook, means for supporting and reciprocating the hook, a reciprocating guide movable angularly to the direction of the reciprocal movement of the hook for engaging the hook and turning it to force it between a tire and a curing bag on the support, means on said guide for engaging an edge of the tire, and means for actuating and synchronizing the movement of said guide and supporting means.

6. In a curing bag removing mechanism, a support, a pivoted hook, means for supporting and reciprocating the hook, and a guide comprising a roller movable angularly to the direction of the reciprocal movement of the hook, whereby the roller engages the hook for turning it to force it between a tire and a curing bag on the support.

7. An apparatus for removing curing bags from pneumatic tires comprising a support for a tire and curing bag assembly, means for retaining the tire on the support, a member including a hook for engaging the curing bag within the tire, said member having a cam surface, means for moving said member to and away from the tire, cam-engaging means for engaging said cam surface, means responsive to movement of said member for advancing the cam-engaging means with respect to said member to position the hook between the tire and curing bag, and means for releasing the stripped tire from the support.

FRANCIS I. HONDERICH.